(12) United States Patent
Cruz

(10) Patent No.: US 6,718,424 B1
(45) Date of Patent: Apr. 6, 2004

(54) BRIDGE CIRCUIT FOR USE IN A COMPUTING PLATFORM

(75) Inventor: Claude A. Cruz, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/458,611

(22) Filed: Dec. 10, 1999

(51) Int. Cl.$^7$ .............................................. G06F 13/20
(52) U.S. Cl. ....................................... 710/315; 710/313
(58) Field of Search ................................. 710/305–315

(56) References Cited

U.S. PATENT DOCUMENTS

| | | | |
|---|---|---|---|
| 5,764,924 A | | 6/1998 | Hong |
| 5,937,175 A | | 8/1999 | Sescila, III et al. |
| 5,953,511 A | * | 9/1999 | Sescila et al. ............... 710/315 |
| 6,006,286 A | * | 12/1999 | Baker et al. .................. 710/22 |
| 6,148,357 A | * | 11/2000 | Gulick et al. ................ 710/107 |
| 6,151,651 A | * | 11/2000 | Hewitt et al. ................ 710/315 |
| 6,202,103 B1 | * | 3/2001 | Vonbank et al. ............... 710/15 |
| 6,256,700 B1 | * | 7/2001 | Sauber ......................... 710/315 |
| 6,263,390 B1 | * | 7/2001 | Alasti et al. .................... 710/1 |
| 6,327,637 B1 | * | 12/2001 | Chang ......................... 710/305 |

FOREIGN PATENT DOCUMENTS

| | | |
|---|---|---|
| EP | 0 803 803 A2 | 4/1997 |
| EP | 0 821 505 A1 | 1/1998 |
| EP | 0 929 170 A2 | 1/1998 |

OTHER PUBLICATIONS

U.S. patent application Ser. No. 09/186,219, Ajanovic et al., filed Nov. 3, 1999.

U.S. patent application Ser. No. 09/414,377, Ajanovic et al., filed Oct. 7, 1999.

U.S. patent application Ser. No. 09/299,771, Asperheim et al., filed Apr. 26, 1999.

U.S. patent application Ser. No. 09/414,974, Asperheim et al., filed Oct. 7, 1999.

U.S. patent application Ser. No. 08/954,334, Bard, filed Oct. 17, 1997.

U.S. patent application Ser. No. 08/993,598, Cruz, filed Dec. 18, 1997.

U.S. patent application Ser. No. 08/223,045, Harriman et al., filed Dec. 30, 1998.

U.S. patent application Ser. No. 09/430,996, Harriman et al., filed Nov. 1, 1999.

U.S. patent application Ser. No. 09/414,999, Harriman et al., filed Oct. 7, 1999.

U.S. patent application Ser. No. 09/186,047, Harriman et al., filed Nov. 3, 1998.

U.S. patent application Ser. No. 09/186,210, Traw et al., filed Nov. 3, 1998.

\* cited by examiner

Primary Examiner—Sumati Lefkowitz
(74) Attorney, Agent, or Firm—Howard A. Skaist; Christopher K. Gagne

(57) ABSTRACT

Briefly, in accordance with one embodiment a bridge circuit for use in a computing platform includes a plurality of signal ports. At least one of the plurality of signal ports is adapted to be coupled to a long haul interface. At least one of the plurality of signal ports is adapted to be coupled to a host interface. At least one of the plurality of signal ports is adapted to be coupled to a short haul interface. The bridge circuit is adapted to provide a bridge between the host interface and one of the short haul interface and the long haul interface. Of course, many modifications, variations, and alternatives are possible without departing from this embodiment.

16 Claims, 4 Drawing Sheets

BRIDGE CIRCUIT FOR USE IN A COMPUTING PLATFORM

BACKGROUND

FIELD

This disclosure is related to interfacing between a device and a host computing platform or system.

BACKGROUND

Two significant challenges that face the computing industry as technology continues to advance are power consumption issues and thermal issues. These issues or challenges are particularly acute in mobile applications in which the platform in more constrained in terms of the amount of power available and/or its capability to handle significant amounts of heat than are some other platforms, such as, for example, a desktop platform. At the same time, computing industry technology is heading in a direction in which high speed serial buses are becoming more desirable. One example of a data transport for this purpose currently gaining industry attention is the IEEE 1394 specification, "IEEE Standard for a High Performance Serial Bus," IEEE Std 1394–1995, Aug. 30, 1996, available from the Institute of Electrical and Electronic Engineers (IEEE), (hereinafter referred to as "1394" or "the 1394 specification"). However, a power consumption and thermal "wall" is expected to arise from the application of 1394 within a power constrained platform, such as, for example, a notebook personal computer (PC) or the like. Of course, although 1394 is discussed here, it is just one example and many other buses employing data transports may have similar issues. Nonetheless, unlike some alternative mobile oriented buses, a 1394 specification compliant interface is a "long haul" data transport intended to drive signals over relatively long distances, such as on the order of meters. This contrasts with a "short haul" interface, which is typically designed to drive intra-chassis signal lines less than 18 inches in length, for example. Therefore, a 1394 specification compliant interface consumes a significant amount of power, and even when not performing signaling. For example, a three port S400-speed physical protocol layer (or "PHY") integrated circuit (IC) consumes about 0.7 watts and an associated host interface link layer IC may add another 0.4 watts. A single 1394 specification compliant point-to-point connection employs two such interfaces. A three port S-800 PHY (operating at 800 megabits per second) is expected to consume about 1.7 watts, with the supporting link adding about 0.7 watts (i.e., 2.4 watts total per S-800 interface). Furthermore, this power is dissipated as heat, which would be undesirable for a thermally constrained platform. Therefore, unfortunately, using 1394 as just one example, these trends appear inconsistent with or present challenges to the application of a long haul data transport to power and thermally constrained platforms. A need, therefore, exists for an approach to address these power and thermal issues so that a long haul data transport, such as the 1394, may be employed even with power and thermally constrained platforms, such as exist in mobile applications, for example.

SUMMARY

Briefly, in accordance with one embodiment of the invention, a bridge circuit for use in a computing platform includes a plurality of signal ports. At least one of the plurality of signal ports is adapted to be coupled to a long haul interface. At least one of the plurality of signal ports is adapted to be coupled to a host interface. At least one of the plurality of signal ports is adapted to be coupled to a short haul interface. The bridge circuit is adapted to provide a bridge between the host interface and one of the short haul interface and the long haul interface.

Briefly, in accordance with another embodiment of the invention, a digital device intraconnect includes the following: two short haul interfaces and two protocol converters. One of the protocol converters is capable of converting from a host interface to a short haul interface and the other of the protocol converters is capable of converting from a short haul interface to an internal device interface.

Briefly, in accordance with yet another embodiment of the invention, a method of relaying signals in a host system includes the following. Signals are transmitted to the host through a host interface. The signals are relayed through a bridge from or to one of an internal device and an external device. The relayed signals are relayed through a short haul interface for the internal device and a long haul interface for the external device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description, when read with the accompanying drawings in which:

DETAILED DESCRIPTION

Figure 1:
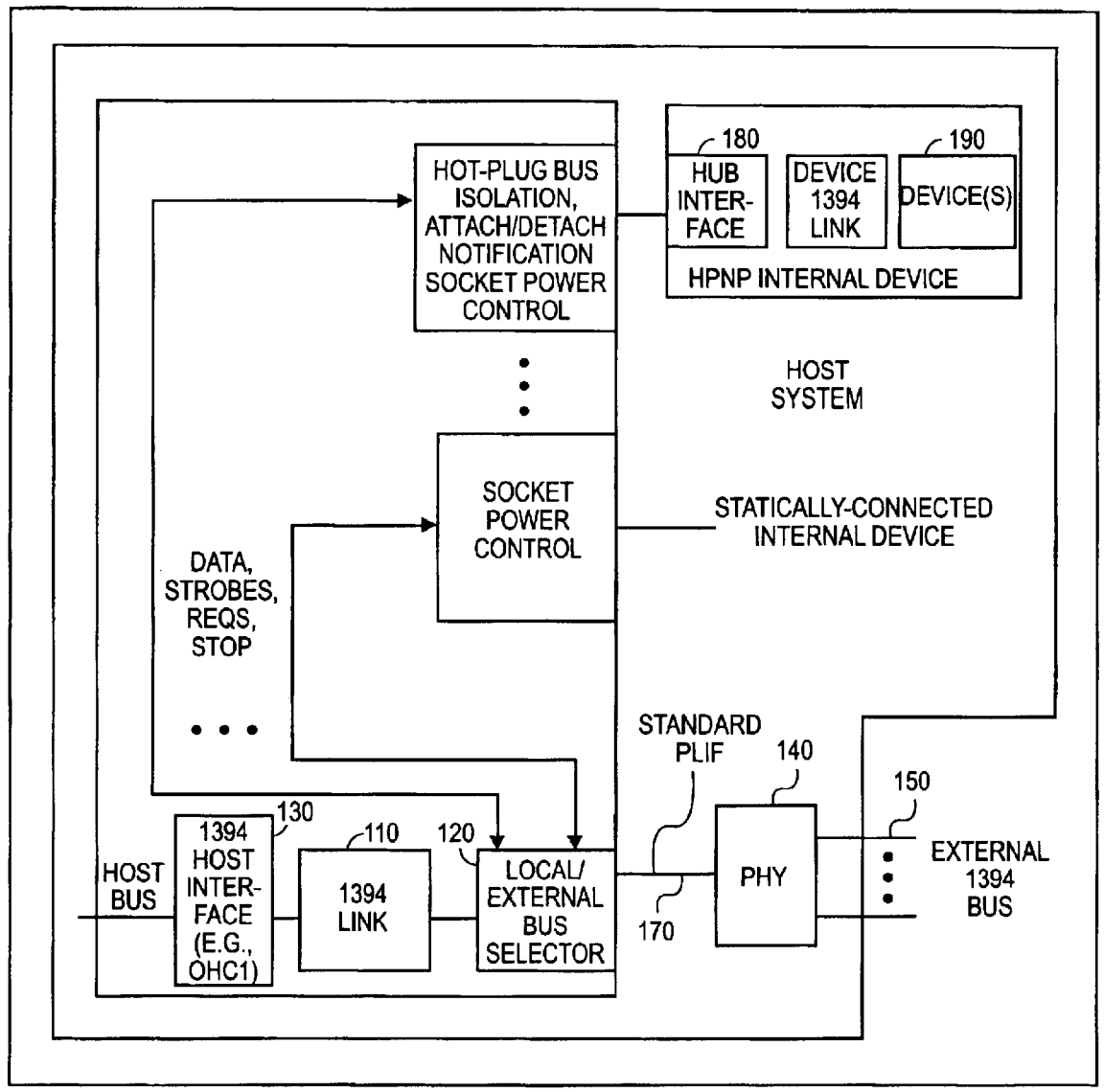
FIG. 1 is a block diagram illustrating an embodiment of a host computing platform that may employ an embodiment of a bridge circuit in accordance with the present invention.

In the following detailed description, numerous specific details are set forth in order to provide a thorough understanding of the invention. However, it will be understood by those skilled in the art that the present invention may be practiced without the specific details. In other instances, well-known methods, procedures, components and circuits have not been described in detail so as not to obscure the present invention.

Although the invention is not limited in scope to the 1394 specification or to complying with or being compatible with the 1394 specification, as previously described, power consumption and thermal issues may exist from the application of the IEEE 1394 specification to a high-speed serial bus in a power constrained platform, such as a notebook PC, for example. Unlike some alternative, mobile oriented buses, such as those that comply with the power managed PCI specification or the Cardbus specification, a 1394 specification compliant interface may consume a significant amount of power even when not performing signaling. In this context, a 1394 specification compliant interface is an example of a "long haul" interface in that sufficient power is present to drive the signals a relatively long distance, such as on the order of several meters, for example. Therefore, the power trends exhibited by 1394 specification compliant devices, at least without adaptation, appear inconsistent with or at least present challenges to the application of the 1394 specification to power and/or thermally constrained platforms.

Much of the power dissipation in a 1394 specification compliant interface results from the power consumed in the physical layer or PHY. As alluded to above, this is due, at least in part, to the desirability of having the PHY be able to drive a signal on or through a cable of approximately 4.5 meters in length. PHY power consumption may also be tied to the architecture of a 1394 specification compliant bus, which employs a PHY that is substantially constantly powered, even when not in use by the 1394 specification compliant "node" which includes the PHY, in order to operate as a signal packet relay between other nodes in the network.

The 1394 protocol was developed to allow devices to communicate at high speed over relatively long cables, such as on the order of 4.5 meters, as previously indicated. However, the desirability of this aspect of the 1394 protocol is relatively less within a self-contained computing platform and, therefore, in this typically more electrically and thermally constrained "intraconnect" environment, it may be desirable to provide an alternative "short haul" interface, in place of a long haul interface, that addresses the power consumption and thermal issues discussed previously. In this context, the term "short haul" interface refers to an interface for driving signals a relatively short distance, such as on the order of approximately 18 inches or even less. For applications within the computing platform, for example, a 1394 specification compliant interface is not required, because, for example, there is no need to drive signals or pulse the relatively long signal lines previously discussed, nor is it necessary to abide by the existing electrical signal levels and signal relay architectures of state-of-the-art 1394 specification compliant buses. Instead, it would be desirable for a short haul interface within the computing platform to retain a standardized packet level service and interface(e.g., a standard or common software interface). Likewise, because devices internal to a computing platform typically have dedicated power couplings within a platform, such an interface, in this particular embodiment, need not support optional bus cable-power capabilities, such as those of a standard 1394 specification compliant device. For example, although the invention is not limited in scope to the 1394 specification, or to complying with or being compatible with the 1394 specification, using that as an example, this reduces the power distribution issues associated with complying with the aspects of the 1394 specification that relate to cable power.

Many embodiments in accordance with the present invention are possible. Several potential embodiments shall be described here, although the invention is not limited in scope to these embodiments because many more embodiments and applications of the present invention are possible and likely to be employed. For example, FIG. 1 illustrates an embodiment of a host computing platform or digital device that may employ an embodiment of a bridge circuit in accordance with the present invention. In this context, the term bridge circuit refers to a device or portion of a device used to electrically co-join or separate two contiguous buses that may be electrically coupled under external, such as program, control. As shall be described in greater detail hereinafter, this embodiment provides a bridge between a host interface and one of a short haul interface and a long haul interface. This may be useful, for example, for a computing platform or digital device where it may be desirable to have the capability to alternatively communicate with devices internal to the computing platform and devices external to the computing platform, using a shared common host interface. As previously suggested, employing a long haul interface for communication with devices internal to a computing platform that may be power and/or thermally constrained may be undesirable.

This particular embodiment provides a bridge architecture that supports both a long haul interface, such as a 1394 specification compliant link circuit (e.g., translation of host bus transactions to/from 1394 packets), and a compatible short haul interface. In this embodiment, the short haul interface comprises a split transaction protocol supporting both asynchronous and isochronous communication, although the invention is not limited in scope in this respect. Although the invention is not limited in scope in this respect, one example of a protocol that may be modified in this regard to provide a short haul interface is the Peripheral Component Interface (PCI) specification, Revision 2.1, 1996, available from the PCI Special Interest Group, Hillsboro, Or. Another example includes the short haul protocol such as may be described in the following patent applications for communicating between or "linking" hubs: U.S. Patent Applications: METHOD AND APPARATUS FOR DUAL MODE OUTPUT BUFFER IMPEDANCE COMPENSATION, Ser. No. 09/299,771, filed by Asperheim et al. on Apr. 26, 1999; METHOD AND APPARATUS FOR MODE SELECTION IN A COMPUTER SYSTEM, Ser. No. 09/414,974, filed by Asperheim et al. on Oct. 7, 1999; METHOD AND APPARATUS FOR COMMUNICATING TRANSACTION TYPES BETWEEN HUBS IN A COMPUTER SYSTEM, Ser. No. 09/186,047, filed by Harriman et al. on Nov. 3, 1998; METHOD AND APPARATUS FOR COMMUNICATING ROUTING AND ATTRIBUTE INFORMATION FOR A TRANSACTION BETWEEN HUBS IN A COMPUTER SYSTEM, Ser. No. 09/186,210, filed by Traw et al. on Nov. 3, 1998; METHOD AND MECHANISM FOR VIRTUALIZING LEGACY SIDEBAND SIGNALS IN A HUB INTERFACE, Ser. No. 09/433,824, filed by Ajanovic on Nov. 3, 1999; METHOD AND APPARATUS FOR INITIALIZING A COMPUTER INTERFACE, Ser. No. 09/414,377, filed by Ajanovic et al. on Oct. 7, 1999; METHOD AND APPARATUS FOR REDUCING FLOW CONTROL AND MINIMIZING INTERFACE ACQUISITION LATENCY IN A HUB INTERFACE, Ser. No. 09/433,913, filed by Ajanovic on Nov. 3, 1999; METHOD AND APPARATUS FOR INPLEMENTING LOCK IN A HUB INTERFACE, Ser. No. 09/434,312, filed by Ajanovic et al. on Nov. 3, 1999; METHOD AND APPARATUS FOR IMPLEMENTING VIRTUAL WIRE SIGNALING, Ser. No. 09/433,654, filed by Ajanovic et al. on Nov. 3, 1999; METHOD AND APPARATUS FOR AN IMPROVED INTERFACE BETWEEN COMPUTER COMPONENTS, Ser. No. 09/186,219, filed by Ajanovic et al. on Nov. 3, 1999; METHOD AND APPARATUS FOR ARBITRATING OWNERSHIP OF AN INTERFACE BETWEEN HUB AGENTS, Ser. No. 09/223,045, filed by Harriman et al. on Dec. 30, 1998; PERIPHERAL COMPONENT INTERCONNECT (PCI) CONFIGURATION EMULATION FOR HUB INTERFACE, Ser. No. 09/433,275, filed by Ajanovic et al. on Nov. 3, 1999; METHOD AND APPARATUS FOR INITIALIZING A HUB INTERFACE, Ser. No. 09/430,996, filed by Harriman et al. on Nov. 1, 1999; METHOD AND APPARATUS FOR HIGH THROUGHPUT MULTIPLEXING OF DATA,"Ser. No. 09/433,628 filed by Lin et al. on Nov. 3, 1999; METHOD AND APPARATUS FOR SUPPORTING MULTI-CLOCK PROPAGATION IN A COMPUTER SYSTEM HAVING A POINT TO POINT HALF DUPLEX, Ser. No. 09/433,653 filed by Osborne et al. on Nov. 3, 1999; and POWER MANAGEMENT METHOD FOR A COMPUTER SYSTEM HAVING A HUB INTERFACE ARCHITECTURE, Ser. No. 09/414,999, filed by Harriman et al. on Nov. 3, 1999; all of the foregoing assigned to the assignee of the present invention.

Therefore, although the invention is not limited in scope in this respect, a 1394 specification compliant device that is internal to a computing platform may be supported by a 1394 specification compliant link circuit and a short haul interface based data-transport layer, in lieu of the more usual 1394 PHY layer, in this particular embodiment. Likewise, 1394 specification compliant devices external to the platform may be supported by a standard 1394 compliant link circuit and attached standard 1394 PHY circuit in this particular embodiment. Therefore, as shall be described in greater detail hereinafter, this particular embodiment allows a host system or computing platform to support, for example, both long haul standard 1394 specification compliant interfaces and power-reduced short haul interfaces. In addition, this particular embodiment also provides data path isolation capability which provides a host system exclusive access to a collection of "private" devices, as well as providing host access to a different set of "public" devices. This embodiment may also provide external "public" devices with controlled access to the host's "private" internal device resources, if so desired.

FIG. 1 is a schematic diagram of an embodiment 100 of a computing platform or digital device that includes an embodiment 120 of a bridge circuit in accordance with the invention. This bridge circuit embodiment includes a plurality of signal ports, at least one of the plurality of signal ports being adapted to be coupled to a long haul interface. Furthermore, at least one of the plurality of signal ports is adapted to be coupled to a host interface, and at least one of the plurality of signal ports is adapted to be coupled to a short haul interface. Therefore, bridge circuit 120 is adapted to provide a bridge between the host interface and one of the short haul interface and the long haul interface. As further illustrated in FIG. 1, the bridge circuit may be coupled to a host interface, such as standard 1394 compliant link circuit 110, bridge circuit 120 being employed to route bus transactions between three or more ports. Although the invention is not limited in scope in this respect, in this embodiment, these ports are coupled to (1) a host interface, such as 1394 compliant link 110, which is coupled to a 1394 compatible host interface 130, (2) a long haul interface, such as standard PHY/ link interface 170 (hereinafter referred to as a "PLIF") (of course, various integration options exist for the long haul interface and a PLIF is just one example) coupled to a standard 1394 compliant PHY 140, through which the bridge circuit provides access to one or more external devices, such as here via an external 1394 compliant bus 150, and (3) one or more short haul interfaces, which provide the host system access to one or more internal devices, internal 1394 compliant devices in this embodiment. In this embodiment, therefore, PHY 140 may provide one or more external ports to which devices compliant with the long haul interface protocol, such as standard 1394 compliant devices in this embodiment, may be coupled, such as by cables. The configuration employed in this particular embodiment allows the host system to access any of the internal or external devices, here 1394 compliant devices, through one host-interface, here a host interface link circuit. In this embodiment a standard PLIF, such as 170 illustrated in FIG. 1, of this single shared host link, is able to be coupled to PHY 140 or to short haul interfaces associated with the internal 1394 compliant devices.

Figure 2:
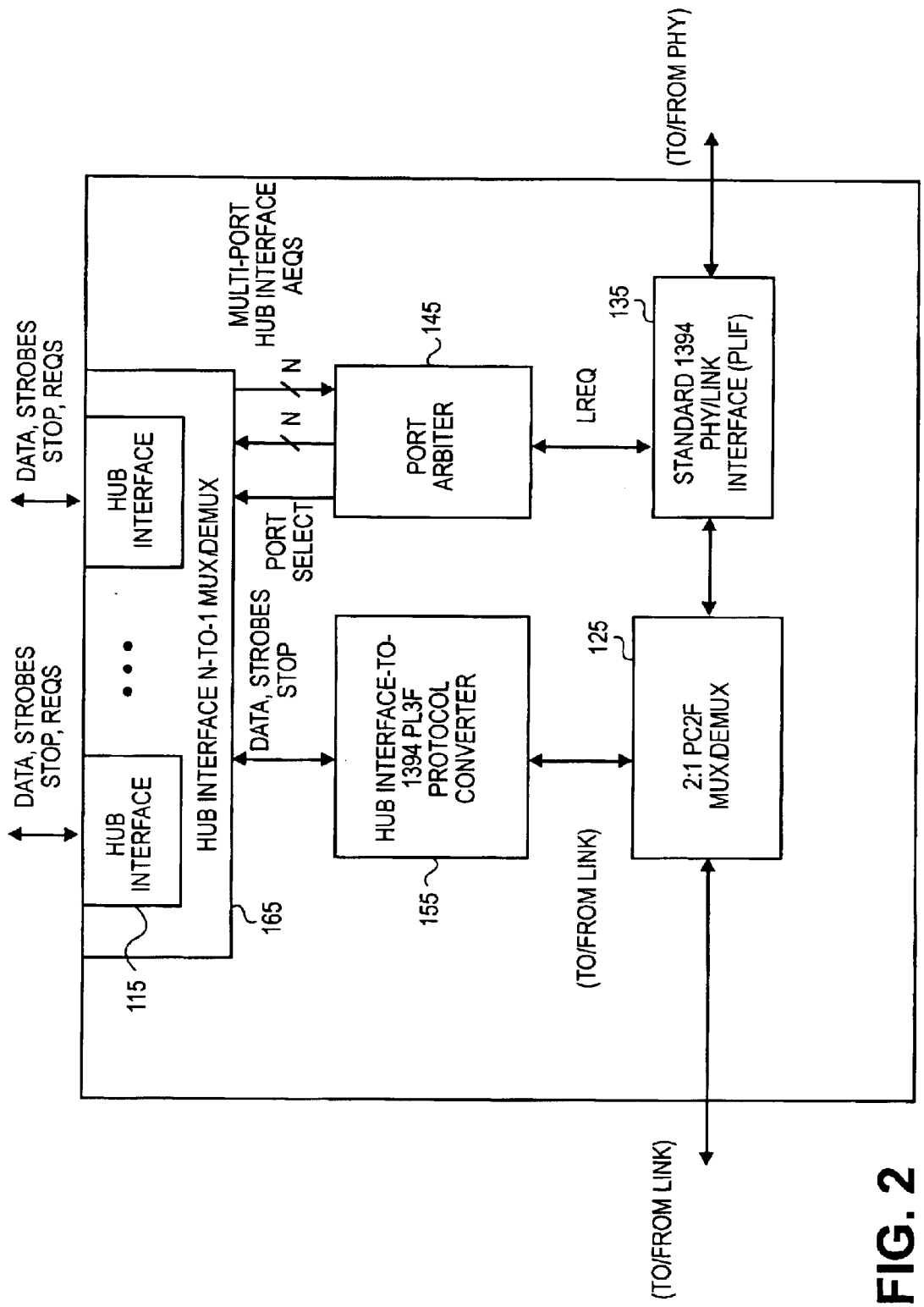
FIG. 2 is a block diagram illustrating in more detail the embodiment of the bridge circuit shown in FIG. 1 and the signal switching paths that it supports.

FIG. 2 is a block diagram illustrating bridge circuit 120 in greater detail. As illustrated, in this embodiment, bridge circuit 120 is adapted for use in a computing platform or digital device that includes a plurality of signal ports. FIG. 2 illustrates the coupling pathways that are provided by the bridge circuit in this particular embodiment. As illustrated, here, the bridge circuit is adapted to provide a bridge between a host interface, such as link layer 110, and one of a short haul interface, such as 180, and a long haul interface, such as PHY/link layer interface 170.

In this particular embodiment, the host digital device or computing platform may either access ports which are coupled to internal devices, such as 1394 compliant devices, or alternatively access ports, here on the PHY, which provide access to external devices, such as here external 1394 compliant devices. However, devices on the external bus have no direct access to devices that reside on internal ports. Therefore, in this particular embodiment, internal devices are "private" resources of the host system. Similarly, devices on internal ports in this particular embodiment cannot directly access the external bus. This arrangement in this embodiment provides an "access path isolation" capability that enables the host system to retain full and exclusive control over its internal 1394 compliant devices, while providing host access to external 1394 compliant devices as well. Although the invention is not limited in scope in this respect, in this embodiment, this arrangement addresses an existing problem regarding undesirable access to internal devices by external devices. For example, without the proposed bus traffic isolation capability, a 1394 compliant agent outside a notebook PC, for example, could potentially access the notebook PC's 1394 compliant hard drive, assuming that the notebook is using a 1394 compliant primary hard disk drive. Such access may, for example, raise data privacy or other security issues and/or may interfere with the normal operation of the PC's operating system. However, for the embodiment illustrated, this access is unavailable. Likewise, should the host system desire to transfer data between external or internal devices, the host system may receive external data into a host buffer, for example, and relay it to a target internal device or vice-versa. Likewise, in an alternative embodiment with additional complexity, the bridge circuit may be augmented to provide direct switching paths or the like between a port coupled to a long haul interface, such as PHY/link interface 170, or PHY 140, providing controlled access to the external 1394 compliant bus, and a given internal short haul port. In such an embodiment, the establishment of host by-pass paths may be under host system control to ensure that the internal devices for the host cannot be accessed externally except via host authorization.

Figure 3:
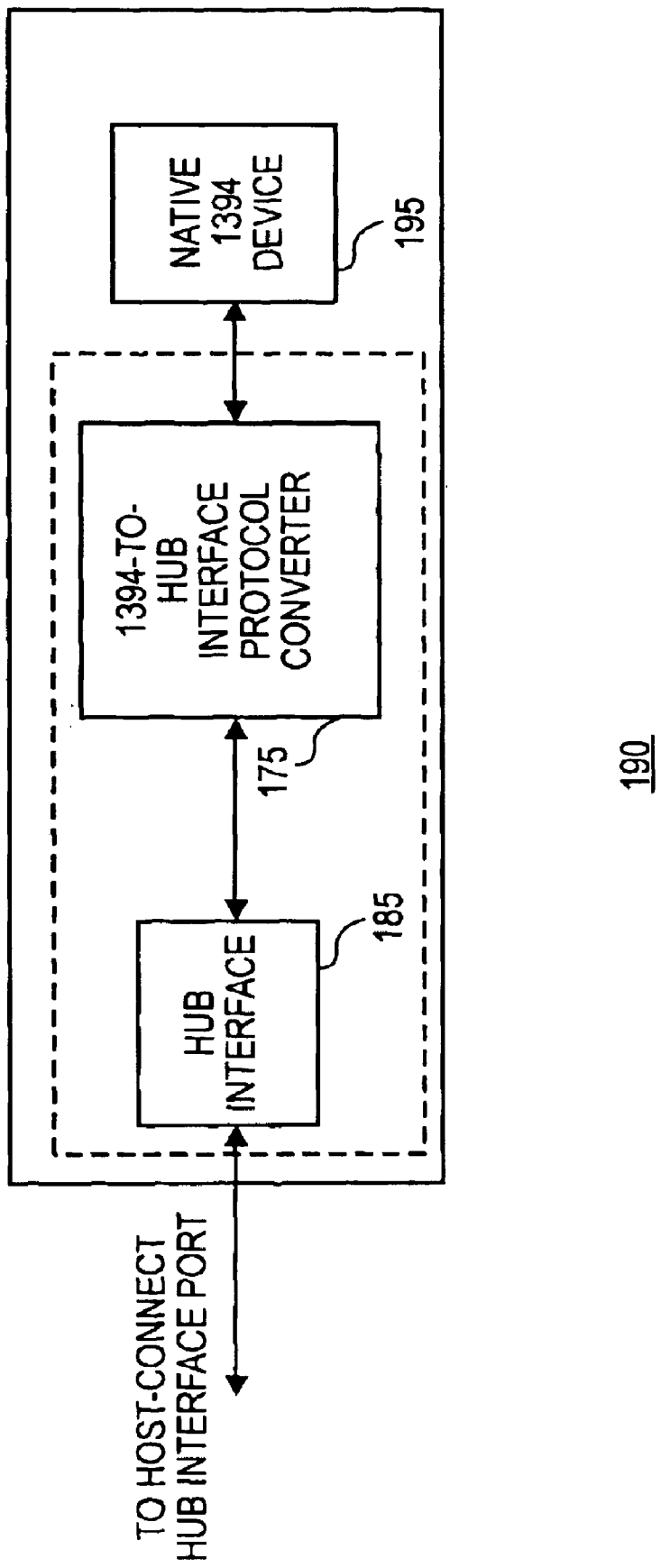
FIG. 3 is a block diagram illustrating an embodiment of an internal device for the host computing platform embodiment of FIG. 1 that is also compatible with the bridge circuit embodiment of FIGS. 1 and 2.

FIG. 3 is a block diagram illustrating internal device 190 in greater detail. For the embodiment illustrated, a device having a long haul compliant interface, such as 195, is coupled as an internal device within a host system. For this particular embodiment, the linkage between the device and the host is provided by a short haul interface, 185 in FIG. 3. In this embodiment, therefore, device 195 is coupled to interface 185 via a 1394 to hub interface protocol converter 175, as illustrated. Although the invention is not restricted in scope in this respect, hub interface 185 comprises a packet-based split transaction protocol supporting both asynchronous and isochronous communication. Hub interface in this context is an Intel Corp. proprietary bus interface based at least in part on serialization of the PCI bus protocol specification, as described in more detail in the aforementioned commonly assigned patent applications. As illustrated in FIG. 3 by dashed lines, protocol converter 175 and hub interface interface 185 may be integrated into a single circuit in some embodiments. However, the invention is not limited in scope in this respect. Furthermore, throughout this specification, blocks or boxes are shown in figures to illustrate providing specific functionality; however, as will be appreciated by one of ordinary skill in the art, these separate blocks or boxes are merely for ease of illustration. Therefore, these functional blocks may be combined and implemented on a single IC or alternatively a single functional block may be implemented using more than a single IC.

Returning to FIG. 2, the architecture for this particular embodiment of a bridge circuit is now described in greater detail. To use the ports providing access to external devices, the external 1394 compliant ports in this embodiment, the host digital device or computing platform configures two-to-one PLIF multiplexor/demultiplexor (MUX/DEMUX) 125 to select a path from the MUX/DEMUX host port to external access PLIF 170 of FIG. 1. The host could perform this operation when desiring access to an external device or in response to the arrival of external data at the host's 1394 compliant node, such as one that includes PHY 140 shown in FIG. 1. For example, such an event may result in a request signal, such as a link request in this embodiment, to occur on the PLIF for PHY 140, which would be signaled to the host.

To access an internal device, an internal 1394 compliant device in this embodiment, the host system could configure PLIF MUX/DEMUX to couple link circuit 110, in this embodiment, to a protocol converter, such as a hub interface-to-1394 PLIF protocol converter, such as 155. Converter 155 is internally coupled to a short haul hub interface N-to-1 MUX/DEMUX, such as 165, which selects the to path from protocol converter 155 to the selected 1394 compliant internal device with which the host desires to communicate. Taken together, in this embodiment, the 2:1 path selector, protocol converter, and N-to-1 path selector provide a program selectable path between the host interface, link circuit 110, and a target internal device. In this particular embodiment, although the invention is not limited in scope in this respect, all the ports on 2:1 selector 125 are standard PLIFs. Thus, when the host is accessing external 1394 compliant ports, for example, the PLIF of link circuit 110 is coupled to PLIF 170 as if the 2:1 selector were not in the path.

N-to-1 path selector 165 in this embodiment includes N+1 ports, each of which comprises a short haul interface in this embodiment. Here, N, of course, is a positive integer, usually greater than one. One of these ports, referred to in this context as the host port, is employed to couple selector 165 to protocol converter 155. The other N ports are employed to couple N internal 1394 compliant devices with one selector port being allocated per internal device in this embodiment. The operation of selector 165 in this particular embodiment is to pass through the data and control signals of a selected internaldevice port to protocol converter 155, which is coupled to the host port of selector 165.

In FIG. 2, port arbiter 145 is employed to control which of the ports of selector 165 is coupled to each other at a given time. When the host system desires to access one of the external access ports or one of the internal devices, the host transmits to arbiter 145 a port select request signal identifying the target port. Arbiter 145 then, in this embodiment, evaluates when the signal path to the target port becomes available. Port arbiter 145 then programs MUX/DEMUX 125 and MUX/DEMUX 165 and external-access port-select logic, typically accomplished through packet addressing, accordingly.

Conversely, a port for an external access PHY, in this embodiment, for example, may receive data for the host, or an internal 1394 compliant device may desire to communicate with the host. Thus, these devices may request the establishment of a signal pathway to the host. If externally originated data arrives at a port of an external access PHY, the PHY may assert a request signal, here a link request signal, to the arbiter, as well as to the host PHY(not shown). The arbiter, in this embodiment, may then select a signal path from the external access PHY to link circuit 110. Depending on the embodiment, of course, the path from the host and the path to the host may not be symmetric, for example, to preserve privacy/security, such as previously described. Similarly, if an internal short haul interface-coupled 1394 compliant device desires to communicate with the host, the device may assert a service request signal to the arbiter, which may then respond by establish a signal path from the device to the host when such a signal path becomes available.

Another aspect of the invention includes protocol converter 155. The converter provides the host interface, link circuit 110, with a standard long haul interface, here a 1394 PHY/link interface (PLIF), that provides access to each internal 1394 compliant device, although each such 1394 compliant device is coupled to the host via a short haul interface. Therefore, the converter provides the capability for the host system to be able to use a single link to communicate with its full set of internal and external 1394 compliant devices. In general, and in this particular embodiment, the protocol converter utilizes the protocol similarities of the long haul and short haul interfaces. Therefore, for example, in this embodiment, both the long haul and short haul interface comprise packet-based split transaction protocols supporting asynchronous and isochronous communication, although the invention is not limited in scope in this respect. In this embodiment, therefore, the short haul interface and 1394 protocols are similar enough that a conversion may be accomplished in a relatively efficient manner. Both interfaces are master/slave capable and both support packet-based read, write and locked transactions, and both support split transactions. In this context, a split transaction refers to a bus transaction in which a transaction request is issued, followed by a separate "request receipt" acknowledgment. At some possibly later time, the transaction executor sends a "transaction ready" indicator to the requester, which then completes the handshake by sending a "transaction completed" indication to the transaction indicator. Split transactions allow several transactions to proceed substantially simultaneously with interleaved transaction phases. Also, as suggested above, while a short haul interface in this particular embodiment is similar to PCI specification compliant devices in terms of transaction types and configuration capabilities, the interface may also, unlike the PCI specification, advantageously support isochronous data handling through a special isochronous transition descriptor attribute. In this embodiment, therefore, a short haul interface may provide a point-to-point intra-chipset coupling mechanism (e.g., between constituent chips of the chip set) making it electrically well-suited for use in coupling internal devices to a chip set, as may occur, for example, in the application illustrated in this particular embodiment.

Although the invention is not limited in scope in this respect, the internal hub interface ports may also include logic that may be employed to make internal devices "hot pluggable," that is attachable to or detachable from the host system while the latter continues to operate. Such logic may provide initially "cold" (e.g., unpowered) coupling of a device to the internal bus. Therefore, the newly-attached device may be isolated electrically until it is properly powered and in a state that will not disrupt the internal bus. In addition, such logic may control the application and removal of power to the device socket. Likewise, such logic may include the capability to generate a signal that is employed to identify to the host system when a device is coupled to or removed from coupling with that port (sometimes referred to as "last event notification"), so that the host system may execute desired device management operations as appropriate. Of course, internal device ports may not employ such logic in some embodiments. Such logic may be desirable for those ports desired to support "hot plugging." Alternatively, internal ports to which devices are attached or removed while the system is unpowered may omit such logic. This is also true of internal ports to which internal devices are permanently coupled, referred to as statically connected. However, an internal device may be desired to have this "hot plugging capability" in some instances (e.g. a bay in a notebook computer, such as for removable devices).

Figure 4:
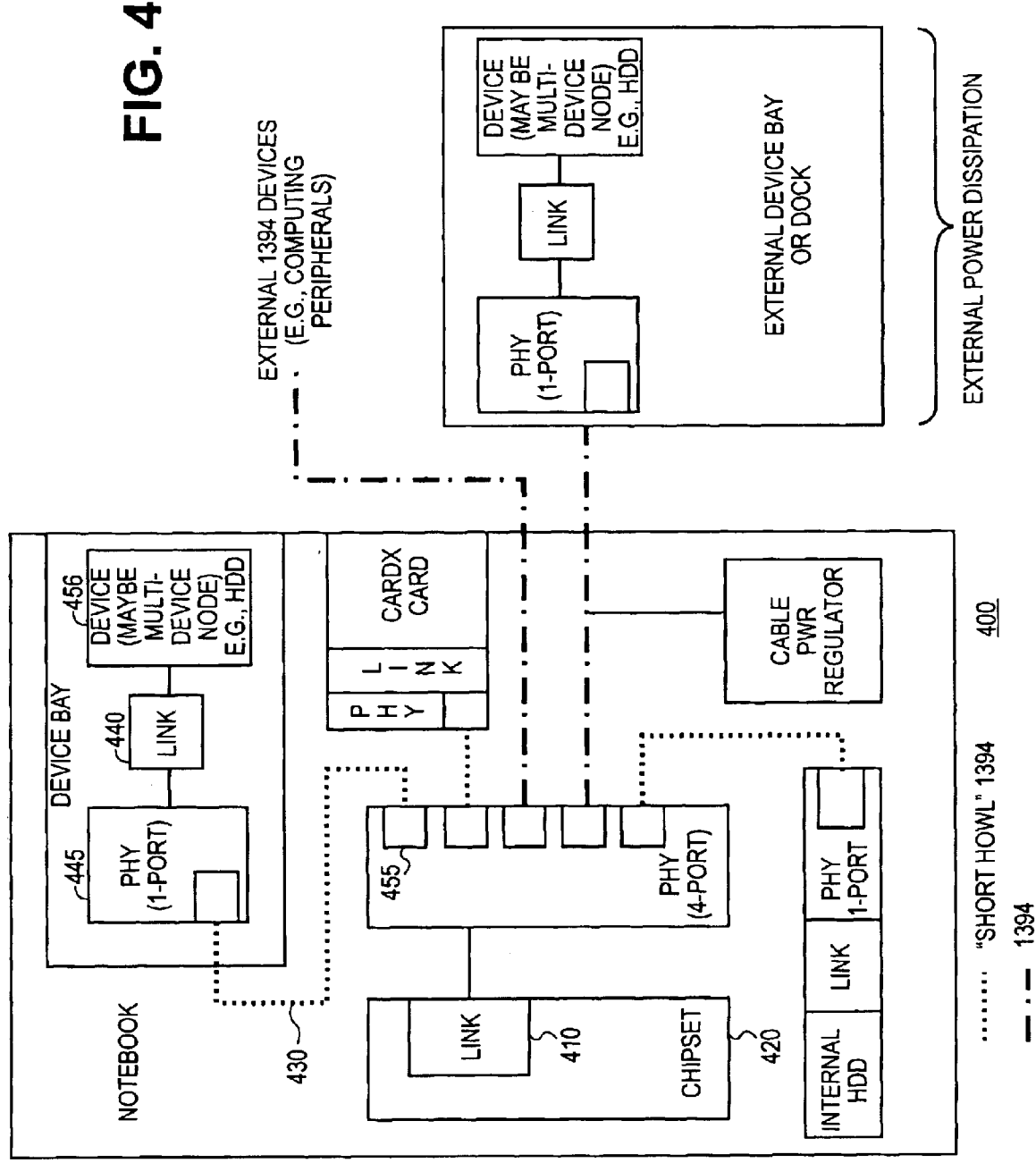
FIG. 4 is a block diagram illustrating another embodiment of a host computing platform or digital device, this embodiment including an embodiment of an intraconnect in accordance with the present invention.

FIG. 4 is a block diagram illustrating an embodiment of a host system in which an intraconnect, such as a 1394 compatible intraconnect, is employed. In this particular embodiment, the 1394 compliant interface does not drive long haul signal lines, nor is it necessary to abide by the existing electrical signal requirements and signal relay architecture of a standard 1394 compliant bus. Instead, in this embodiment the standard packet level services and interface provided by a long haul interface, such as a 1394 link circuit, are retained, but the device side of the link (as opposed to the host side) is coupled to a short haul interface, rather than to a standard long haul interface circuit, such as a 1394 PHY. For example, in this embodiment, since internal devices typically have dedicated power couplings within a platform, in this embodiment, such an interface may not support the optional cable power capabilities of a standard 1394 compliant system. This reduces many of the power distribution implementation issues associated with providing power, such as cable power, in a manner that complies with a long haul interface protocol, such as the standard 1394 protocol. For the embodiment illustrated in FIG. 4, a digital device or computing platform intraconnect includes two short haul interfaces and two protocol converters. For example, an intraconnect may couple a host side PHY, such as 455, with a device side PHY, such as 445. Therefore, one of the protocol converters of the intraconnect would include the capability to convert from a host interface to a short haul interface and the other of the protocol converters would include converting from the short haul interface to the internal device interface. As an example, in this particular embodiment, although the invention is not limited in scope in this respect, device 450 may comprise a hard disk drive.

As illustrated by FIG. 4, using a short haul interface in lieu of a long haul interface, such as a 1394 compliant PHY, addresses anticipated power and thermal problems that may arise by employing a standard long haul interface, such as 1394 interface. This approach makes employing a long haul data transport, such as, for example, 1394, within a power and/or thermally constrained platform, such as a notebook PC, for example, more realizable and attractive than alternative approaches.

In accordance with yet another embodiment of the invention, a method of relaying signals in a host system includes the following. Signals are transmitted to the host through a host interface. The signals are relayed through a bridge from or to one of an internal device and an external device. The relayed signals are relayed through a short haul interface for the internal device and a long haul interface for the external device. Although the invention is not limited in scope in this respect, this embodiment may be performed by the embodiment of the invention previously described and illustrated. Likewise, as previously described, the host interface may comprise a 1394 specification compliant link layer, the long haul interface may comprise a 1394 specification compliant PLIF, and the short haul interface may comprise a packet-based split transaction protocol supporting asynchronous and isochronous communication, although, of course, this is just one example and the invention is not limited in scope in this respect.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A bridge circuit for use in a computing platform, said bridge circuit comprising:
   a plurality of signal ports;
   at least one of said plurality of signal ports being adapted to be coupled to a long haul interface;
   at least one of said plurality of signal ports being adapted to be coupled to a host interface; and
   at least one of said plurality of signal ports being adapted to be coupled to a short haul interface;
   said bridge circuit being adapted to provide a bridge between said host interface and one of said short haul interface and said long haul interface;
   wherein said bridge circuit further includes the capability to alternatively provide a host with access to one or more internal 1394 specification compliant devices.

2. The bridge circuit of claim 1, wherein said host interface comprises a 1394 specification compliant link layer.

3. The bridge circuit of claim 1, wherein said long haul interface comprises a 1394 specification compliant physical layer (PHY)/link layer interface (PLIF).

4. The bridge circuit of claim 3, wherein said bridge circuit includes the capability to provide a host with access to one or more external 1394 specification compliant devices.

5. The bridge circuit of claim 4, wherein said bridge circuit has the capability to provide a host with said access via said PLIF, said host interface, and an external access 1394 specification compliant physical protocol layer (PHY) coupling to the one or more external 1394 specification compliant devices.

6. The bridge circuit of claim 1, wherein each of the one or more internal 1394 specification compliant devices includes a short haul interface and a protocol converter for converting from native 1394 specification compliant transactions to the short haul interface.

7. The bridge circuit of claim 6, wherein the short haul interface comprises a packet-based split transaction protocol supporting both asynchronous and isochronous communication.

8. The bridge circuit of claim 1, wherein said bridge circuit includes a port arbiter;

said port arbiter being adapted to arbitrate between path access requests for access via said bridge circuit.

9. The bridge circuit of claim 8, wherein the path access requests originate from at least one of the host, an external 1394 specification compliant device and one of the internal 1394 specification compliant devices.

10. The bridge circuit of claim 1, wherein said bridge circuit includes the capability to provide a host with selectable alternative access to one or more external 1394 specification compliant devices and to said one or more internal 1394 specification compliant devices.

11. The bridge circuit of claim 10, wherein said bridge circuit includes a path multiplexer coupled to said host interface.

12. The bridge circuit of claim 11, wherein said host interface comprises a 1394 specification compliant link layer.

13. The bridge circuit of claim 11, wherein said path multiplexer is coupled so as to have the capability to select a path between said one or more external 1394 specification compliant devices via an external access 1394 specification compliant PHY, and said one or more internal 1394 specification compliant devices.

14. The bridge circuit of claim 13, wherein the path of said path multiplexer to said one or more internal 1394 specification compliant devices includes a short haul interface to 1394 protocol converter.

15. The bridge circuit of claim 14, wherein said protocol converter is coupled to a 1 of n path selector, capable of selecting 1 of n short haul interface device attachment ports for coupling to an internal device.

16. The bridge circuit of claim 15, wherein said short haul interface comprises a packet-based split transaction protocol supporting both asynchronous and isochronous communication.

* * * * *

UNITED STATES PATENT AND TRADEMARK OFFICE
CERTIFICATE OF CORRECTION

PATENT NO. : 6,718,424 B1
DATED : April 6, 2004
INVENTOR(S) : Cruz

It is certified that error appears in the above-identified patent and that said Letters Patent is hereby corrected as shown below:

Column 7,
Line 41, immediately before "path", delete "to".

Signed and Sealed this

Twenty-ninth Day of June, 2004

JON W. DUDAS
*Acting Director of the United States Patent and Trademark Office*